3,844,997
DISPERSING AGENTS FOR ADHESIVES

James L. Guthrie, Ashton, and Lenore L. Huffman, Ellicott City, Md., assignors to W. R. Grace & Co., New York, N.Y.
No Drawing. Continuation-in-part of abandoned application Ser. No. 260,232, June 6, 1972. This application Nov. 19, 1973, Ser. No. 417,028
Int. Cl. C08g 51/06; C08j 1/46
U.S. Cl. 260—29.2 N                                    2 Claims

ABSTRACT OF THE DISCLOSURE

This invention relates to adhesive compositions usually employed as aqueous dispersions comprising a powdered polyamide and a minor amount of a water-insoluble dispersing agent comprising a mixture of clay and aluminum oxide.

---

This application is a continuation-in-part of copending application having Ser. No. 260,232, filed June 6, 1972, and now abandoned.

This invention relates to powdered adhesives usually applied as aqueous dispersions. More particularly the invention is directed to hot melt adhesive compositions of a powdered polyamide usually applied as an aqueous dispersion in combination with a dispersing agent.

Certain thermoplastic resins such as polyamides and polyesters are used as adhesives, for example, in metal to metal bonding such as in the fabrication of cans. These adhesives can be applied from solution or from the melt, but some advantages result when the finely divided thermoplastic adhesive is applied from an aqueous dispersion through a nozzle as in a can-lining machine. In bonding can ends to the body with an adhesive, it is important to be able to balance the amounts of ingredients to obtain the proper degree of stability, lineability through conventional nozzles, sintering performance of the adhesive, lack of "slump" before the adhesive is sintered; strength of the final joint and chemical compatibility of the adhesive and dispersing agent with the metal of the substrates to be bonded or the lacquer thereon.

Although the conventional water-soluble dispersing agents used in combination with polyamide and polyester adhesives are operable to form good adhesive bonds between the metal substrates of a can, various problems arise when contents of the can are water containing. For example one drawback to the use of water-soluble thickening and dispersing agents such as poly(ethylene oxide) or ammonium casienate is that they weaken the adhesive joint when it is wetted (as in a filled beer can). Another drawback of the water-soluble dispersing agents when the can contains water is that the dispersing agents attack the lacquers, adhesive films or interfere with adhesion between the metal, lacquers and the adhesives.

One object of the present invention is to provide dispersing agents which can be used in aqueous dispersions of polyamide adhesives which will give proper nozzle flow characteristics to the dispersion. Another object of the instant invention is to provide dispersing agents which are not detrimental when the adhesive joint which is formed is subsequently exposed to a water solution.

The above and other objects as will be apparent from a reading hereinafter are provided herein by forming an adhesive composition comprising an aqueous dispersion of a polyamide in combination with a minor amount of a water insoluble dispersing agent comprising clay and aluminum oxide. The dispersing agent combination of clay and finely divided aluminum oxide in polyamide aqueous dispersions yields a thermoplastic adhesive which (1) has good flow properties through a nozzle, (2) forms an adhesive bead which dries easily without cracking or shrinking and (3) forms a good adhesive bond to lacquered metal, said adhesive bond being resistant to hot water or aqueous alcoholic solutions.

In carrying out the instant invention it is necessary that both components of the dispersing agent be present in order to obtain the aforesaid properties. That is, although the aluminum oxide reinforces the polyamide and does not interfere with sintering, it is by itself not a sufficient dispersing agent to give good performance when passing the aqueous dispersion through the nozzle. On the other hand the clay, although having excellent dispersion properties which yields very free flow through the nozzle, can cause slumping of the bead during fusing of the polymer. Additionally clay loadings above 3% of the solids content prevents sintering of the polyamide. Thus as can be seen it is necessary to have both components present in order to obtain the synergistic effect.

The clay in the dispersing agent is usually present in an amount ranging between 0.1 to 3.0 weight percent of the total solids present. Various commercially available clays are operable including, but not limited to, bentonite, kaolin, china clay, ball clay and fuller's earth.

The clay is present in a particle size of minus 325 mesh.

The aluminum oxide in the dispersing agent is present in an amount ranging between 1.0 to 10.0 weight percent of the total solids present in the dispersion. Various commercially available aluminum oxides are operable herein including, but not limited to, "Conopal" commercially available from Continental Oil Co.; "KA–100" commercially available from W. R. Grace & Co.; "A–16" commercially available from Alcoa and "Alon" fused alumina commercially available from Cabot Corporation. The aluminum oxide is employed in a particle size of minus 325 mesh. The total inorganic solids employed as dispersion agents cannot exceed 13% by weight of the total solids present with the polyamide adhesive making up the balance of the total solids. If the amount of the dispersing agents is in excess of 13 weight percent, the adhesive fails to sinter.

The polyamides making up the balance of the total solids in the instant invention are well known commercial products. Examples of operable polyamides employed herein include, but are not limited to, nylon 11, i.e. a polyamide of 11-aminoundecanoic acid and nylon 12, i.e. a polyamide of 12-aminododecanoic acid. The polyamides employed have a particle size of less than 325 mesh.

It is critical that the solid particles in the powdered adhesive composition of the present invention are minus 325 mesh in applying the adhesive composition through lining machines. Particles greater than 325 mesh separate out of the composition causing the material to exit the lining machines as water droplets (drooling) followed by powder-enriched adhesive material thus forming a non-uniform bead. Additionally when the adhesive material becomes powder enriched, increased pressure is usually required to force it out of the lining nozzle thereby adding another variable to the operation.

In making up the aqueous dispersion it is critical that the water content be between 48 and 65% of the total aqueous dispersion. Higher water content results in beads which slump and thus form irregular seals. By "slumping" is meant herein the loss of profile after the adhesive bead is lined on the part to be adhered. Lower water content restricts the free flow in the nozzle which results in irregular beads being formed ab initio.

In addition to water, ethyl alcohol can be added up to 100% by weight of the liquid to form a 50/50 water/ethyl alcohol solution in the instant invention.

The substrates adherable by the practice of the instant invention are metal substrates such as aluminum, steel e.g. black plate, shim steel, tin free steel and other well known steels used in the can industry.

The following examples will aid in explaining but expressly not limit the instant invention. Unless otherwise noted all parts and percentages are by weight.

The peel test employed to determine the measure of deterioration of the bond strength after exposure to hot alcohol and water was the T-peel test method set out in ASTMD 1876-69.

EXAMPLE 1

To a Waring blender was charged 193 grams of water, 1.0 gram of bentonite clay (minus 325 mesh) and 6.0 grams of "Conopal" alumina (minus 325 mesh) commercially available from Continental Oil Co. The blender was agitated at low speed for 10 minutes and thereafter 145 grams of a polyamide of 11-aminoundecanoic acid (minus 325 mesh) commercially available from Rilsan Corporation was added to the blender for a 42% solids dispersion. Agitation was continued for an additional 5 minutes resulting in a tooth paste consistency. The adhesive was easily lined in a lining machine.

A 1" x 2" x 5 mil thick layer of the adhesive was coated onto one of two 1" x 3" x 11 mil lacquered aluminum adherends which was heated on a hot plate to drive off the water and sinter the adhesive. Two adherends with the adhesive between the adherends were pressed together on a platen press at 220° C. at 1000 lbs. pressure. The sample was made up in triplicate. The samples were removed from the press and cooled down to room temperature. To simulate beer pasturization the samples were subjected to 2 hours at 160° F. in 5% aqueous ethanol. The samples were then subjected to a T-peel test which required an average of 26 pounds per inch to separate the adherends.

The T-peel test showed that the adhesive adhered to the lacquer and that the lacquer tore away from the aluminum leaving bright metal with no evidence of coating with scum. This indicates that the water-insoluble dispersing agents are not penetrating the lacquer.

EXAMPLE 2

Example 1 was repeated except that the alumina was "Alcoa A-16" which had been ground to minus 325 mesh. The results were substantially the same.

EXAMPLE 3

Example 1 was repeated except that the alumina was "Grace KA-100" (minus 325 mesh). The results were substantially the same.

EXAMPLE 4

Example 1 was repeated except that 145 grams of a polyamide of 12-aminododecanoic acid commercially available from Rislan Corporation was substituted for nylon 11. The results were substantially the same.

EXAMPLE 5

To a Waring blender was charged 193 grams of water, 5 grams of bentonite clay and 15 grams of "Conopal" alumina. Both the clay and the alumina were ground to minus 325 mesh. The blender was agitated at low speed for 10 minutes and thereafter 132 grams of a commercially available polyamide of 11-aminoundecanoic acid, i.e. nylon 11, was added to the blender for a 44% solids dispersion. Agitation was continued for an additional 5 minutes. The dispersion was not linable with any consistency due to the high amount of dispersing agents. A 1" x 2" x 5 mil thick layer of the adhesive dispersion was coated onto one of two 1" x 3" x 11 mil lacquered aluminum adherends. The coated adherend was heated on a hot plate to drive off the water and sinter the adhesive. The nylon adhesive would not sinter due to the heavy concentration of the dispersing agents.

The following examples show the problems encountered with either no dispersing agents or water soluble dispersing agents present with the adhesive.

EXAMPLE 6

To 200 grams of water in a Waring blender was added 133 grams of a commercially available polyamide of 11-aminoundecanoic acid powder (minus 325 mesh) and the blender was agitated for 10 minutes. The nylon settled out and the very poor dispersion would not line at all in a lining machine. This adhesive was hand painted onto one of two 1" x 3" x 11 mils thick lacquered aluminum strip, dried and sintered and then pressed into contact with the other lacquered aluminum strip on a platen press at 220° C. and 1000 lbs. pressure. The resulting structure pulled apart at approximately 26 lbs. per inch stripping lacquer from one piece of aluminum and leaving clean metal at the stripped surface.

EXAMPLE 7

Example 6 was repeated except that 0.2% by weight of the solids of a polyethylene oxide under the tradename "Polyox WSR-750" commercially available from Union Carbide Co. was added to the adhesive dispersion and agitated in the Waring blender. The dispersion was still not linable. When the adhesive was hand painted on a 1" x 3" x 11 mil lacquered aluminum adherend, dried, sintered and adhered to another lacquered aluminum strip on a platen press, the peel strength was approximately 26 lbs. per inch.

When the concentration of "Polyox" was increased enough to get linable dispersions (approximately 0.5%) the bond strength in the peel test dropped to approximately 13 pounds per inch. Additionally after pasturization and peel strength measurement, the exposed metal was dull and coated with "Polyox," indicating that the "Polyox" dispersing agent had penetrated the lacquer and weakened the metal lacquer interface.

Similar results in bond strength and penetration of lacquer were obtained with other water-soluble dispersing agents that is ammonium casienate, gelatin, hydroxypropyl cellulose and carboxymethyl cellulose.

What is claimed is:

1. An adhesive composition consisting of an aqueous dispersion, having a water content between 48 and 65% by weight of the total aqueous dispersion, a member of the group consisting of a polyamide of 11-aminoundecanoic acid and a polyamide of 12-aminododecanoic acid in an amount between 87 and 98.9% by weight of the solids in said dispersion, 0.1 to 3.0 weight percent of the total solids of a clay and 1.0 to 10.0 weight percent of the total solids of aluminum oxide, all of said solids having a particle size of minus 325 mesh.

2. An adhesive composition consisting of a solid in liquid dispersion, said liquid portion being between 48 and 65% by weight of the composition and containing up to 50% by weight of the liquid portion of ethanol with the balance being water, a member of the group consisting of a polyamide of 11-aminoundecanoic acid and a polyamide of 12-aminododecanoic acid in an amount between 87 and 98.9% by weight of the solids in said dispersion, 0.1 to 3.0 weight percent of the total solids of a clay and 1.0 to 10.0 weight percent of the total solids of aluminum oxide, all of said solids having a particle size of minus 325 mesh.

References Cited
UNITED STATES PATENTS

| | | | |
|---|---|---|---|
| 2,332,939 | 10/1943 | Schmitz | 260—29.2 E |
| 2,631,334 | 3/1953 | Bailey | 260—29.2 N |
| 3,336,415 | 8/1967 | Kennedy | 260—831 |
| 3,390,134 | 6/1968 | Kibler | 260—29.2 E |

FOREIGN PATENTS

| | | | |
|---|---|---|---|
| 1,181,266 | 2/1970 | Great Britain | 260—29.2 E |

JOHN C. BLEUTGE, Primary Examiner

J. ZIEGLER, Assistant Examiner

U.S. Cl. X.R.

260—6, 7.5, 13, 16, 29.2 E, EP, 37 N, 40 R